United States Patent [19]

Wiita

[11] 3,755,238

[45] Aug. 28, 1973

[54] HIGH GLOSS AND LOW BLOCK COATING COMPOSITION CONTAINING PLASTICIZED VINYL RESIN LATEX AND FINELY DIVIDED POLYOLEFIN PARTICLES

[76] Inventor: Ronald E. Wiita, 7625 Hartman Rd., Rt. 2, Wadsworth, Ohio 44281

[22] Filed: Dec. 28, 1970

[21] Appl. No.: 102,097

[52] U.S. Cl...... 260/29.6 XA, 52/144, 117/161 UZ, 117/161 UF, 161/247, 260/8, 260/17 R, 260/23 H, 260/23.7 A, 260/29.6 RB, 260/29.7 UA
[51] Int. Cl. .......................................... C08f 45/24
[58] Field of Search ................. 260/29.6 XA, 896, 260/897

[56] References Cited
UNITED STATES PATENTS

| | | |
|---|---|---|
| 3,085,921 | 4/1963 | Zeise.................. 161/252 |
| 3,432,339 | 3/1969 | Howell et al............... 260/29.6 XA |
| 2,737,502 | 3/1956 | Land et al...................... 260/23 R |
| 2,994,677 | 8/1961 | Bohnert et al. ............. 260/29.6 XA |
| 3,247,141 | 4/1966 | Stryker et al. ............. 260/29.6 XA |
| 3,283,036 | 11/1966 | Larson........................ 260/29.6 XA |

*Primary Examiner*—Harold D. Anderson
*Attorney*—George P. Maskas, Edward L. Mandel and George A. Kap

[57] ABSTRACT

A latex-based coating composition having high gloss and improved block resistance comprising a plasticized vinyl resin latex containing fillers and dispersed therein microfine polyolefine particles. Though these compositions can be coated upon a wide variety of substrates, they are particularly valuable in the preparation of coated acoustical ceiling tiles to produce good gloss and reduce blocking. The invention also includes said acoustical ceiling tiles coated with said coating composition.

6 Claims, No Drawings

HIGH GLOSS AND LOW BLOCK COATING COMPOSITION CONTAINING PLASTICIZED VINYL RESIN LATEX AND FINELY DIVIDED POLYOLEFIN PARTICLES

The present invention is directed to vinyl resin latex based coating compositions which display good gloss characteristics and exceptional improvement in antiblocking. More particularly, the invention relates to coating compositions comprising a vinyl resin latex and fillers to which there has been added finely divided polyolefin particles which are dispersed therein. The addition of these finely divided polyolefin particles produces substantial improvements in block resistance while surprisingly retaining the desired gloss characteristics which are necessary in many applications.

The coating compositions of the present invention may be applied to various substrates which include, for example, paper, cloth, glass, wood, plastics, metal, cement, paperboard, fibreboard and the like. The coating compositions are particularly suitable for the coating of acoustical ceiling tiles which generally comprise fibrous mineral materials such as asbestos fiber and gypsum and the like. In recent years, semi-gloss and high-gloss coatings for acoustical ceiling tiles have grown substantially in interest. Because of the manufacturing processes involving high speeds and substantial heat, there have been encountered significant problems in blocking incurred during handling and storing of the tiles when coated with these glossy finishes. Various attempts have been made to overcome these blocking problems, but there has not yet been achieved a method of accomplishing this purpose while at the same time maintaining the desirable gloss. For example, it has been proposed to substantially increase the amount of filler employed in latex coatings to reduce block, but this practice has resulted in the production of coatings with very low gloss.

According to the present invention, it has been found that vinyl resin latex coatings for coating tiles and other surfaces can be substantially reduced in block characteristics while maintaining good gloss characteristics by incorporating in the latex a dispersion of finely divided polyolefin, e.g., polyethylene and polypropylene, in a particle size of about less than 50 microns and preferably, from 8 to 30 microns in an amount of 0.5 percent to 50 percent by weight based on the weight of the latex.

Aqueous emulsions of vinyl resins, i.e., latex based coatings, are, of course, well known in the art. Useful vinyl resins, i.e., resins prepared from monomers containing at least one

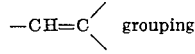

include homopolymers, copolymers, and terpolymers and the like, such as polyvinyl chloride, polyvinyl acetate, polyvinyl propionate, polyvinyl butyrate, polymerized vinylidene chloride, polymerized acrylic acid and its lower alkyl esters such as those containing up to ten carbon atoms, as for example, polymerized ethyl acrylate, polymerized methyl acrylate, polymerized propyl acrylate, polymerized butyl acrylate, polymerized methyl methacrylate, and the like; copolymers of the above with each other such as vinyl chloride-vinyl acetate copolymer, vinylidene chloride-vinyl chloride copolymer, methyl methacrylate-vinyl chloride copolymer, methyl acrylate-ethyl acrylate copolymer, ethyl acrylate-butyl acrylate copolymer, and the like and copolymers and terpolymers of the above with other monomers copolymerizable therewith, such as vinyl esters including vinyl bromide, vinyl chloroacetate, vinyl alkyl sulfonates, trichloroethylene and the like; vinyl chloroethyl ether and the like; cyclic unsaturated compounds such as styrene, chlorostyrene, coumarone, vinyl pyridine and the like; maleic and fumaric acid and their derivatives such as diethyl maleate, dibutyl maleate, dimethyl fumarate and the like; unsaturated hydrocarbons such as ethylene, propylene, butylene and the like; allyl compounds such as allyl acetate, allyl chloride, allyl ethyl ether, and the like; conjugated and cross-conjugated unsaturated compounds such as butadiene, isoprene, chloroprene, 2, 3-dimethylbutadiene-1, 3, divinyl ketone and the like.

Since the resins are to be used in emulsion form, it is, of course, convenient to prepare the resins by the well-known techniques of emulsion polymerization. Not only may copolymers and homopolymers of vinyl monomers be utilized, but also, there can be used mixtures of vinyl resins in preparing the coating composition. For convenience of use, commercially available vinyl resins in the form of aqueous latexes are preferred.

A particularly preferred class of vinyl resins are vinyl chloride polymers and copolymers containing at least 25 percent of polymerized vinyl chloride. In this case, particularly preferred are polyethylene, vinyl chloride-butylacrylate copolymers containing at least 50 percent polymerized vinyl chloride and vinyl chloride-methylacrylate copolymers containing at least 80 percent polymerized vinyl chloride.

In order to produce the necessary properties of flexibility in the dried coated films, it may be necessary to include with the vinyl resin suitable plasticizers. Suitable plasticizers for the vinyl resin include ester type plasticizers such as tributyl phosphate, dioctyl phthalate, dipropylene glycol dibenzoate, phenyl phosphate, dibutyl tartarate, amyl tartarate, butyl benzyl benzoate, dibutyl sebacate, dioctyl adipate, didecyl adipate and the like, rubbery plasticizers such as butadienestyrene copolymer, butadiene-acrylonitrile copolymer and the like and other materials which function as plasticizers such as epoxidized drying oils, aromatic hydrocarbon condensates and the like.

The coating compositions, in addition to containing the vinyl resin latex and possibly, plasticizer therefor, also contain high amounts of pigments and fillers on the order of 5 to 40 percent by volume concentration. The composition also may contain conventional wetting agents, thickening agents, anti-foam agents, sequestering agents and alkali. Suitable wetting agents include the sodium salt of polymerized alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable anitfoam agents are pine oil, silicone anti-foam agents such as Anti-foam A, manufactured by the Dow-Corning Company, Midland, Mich. diglycol laurate, and octyl alcohol. Suitable sequestering agents include tetrasodium pyrophosphate and the tetrasodium salt of ethylenediamine tetra-acetic acid. The alkali provides a pH of above 7.0 so that there will be no tendency for the latex to coagulate. Calcium hydroxide, sodium hydroxide, ammonia, and potassium hydroxide are suitable alkalis for this purpose.

The pigments utilized in the coating composition include hiding pigments such as titanium dioxide, zinc oxide, and the like. Inert fillers, also termed extender pigments, include silica, whiting, talc, clay, pumice, and the like. As previously indicated, the amount of pigment in the total coating composition may range from about 5 percent to about 40 percent and preferably from 10 percent to 20 percent, by volume.

Stabilizers or preservatives to increase the life of the coatings obtained with the instant compositions are also generally included. Among the various well known stabilizers which may be utilized are sulfides and sulfites of aluminum, silver, calcium, cadmium, cerium, sodium, magnesium, strontium, lead and tin stearates, oleates and other complexes, glycerine, leucine, alanine, o- and p- aminobenzoic and sulfanilic acids, hexamethylene tetramine, salts including phosphates, stearates, palmitates, oleates, ricinoleates, abietates, laurates, salicylates, and the like.

To prepare the compositions, it is desirable to first disperse the pigments in water in the presence of the wetting agents and the like. A paste-like material is obtained which is subsequently mixed with the other components of the composition.

The other components of the composition of course comprise the latex having dispersed therein the finely divided polyolefin particles. This latex, containing the plasticized vinyl resins described above or containing the vinyl resins with plasticizer in an aqueous emulsion, conveniently as prepared in emulsion polymerization, also normally includes a thickener solution such as described above. Alternatively, the thickening agents can be put in the pigment base previously prepared.

The polyolefin resins which can be employed in the present invention include polyethylene and polypropylene, as well as copolymers thereof which are, of course, widely available and prepared by well known methods. The polyethylene or the like should have a molecular weight of about 10,000 to 15,000 and be of very fine particle size ranging from about 8 to 30 microns. Typical finely-divided polyethylene is Microthene FN 500, a microfine low density polyethylene powder manufactured by U.S.I. Chemicals, which has the following characteristics:

| Polyolefin Type | low-density polyethylene |
|---|---|
| Melt Index (g/10 min) | 22 |
| Density (g/cu cm) | 0.951 |
| Bulk Density (lb/cu ft) | 17 to 20 |
| Vicat Softening Temperature (°C) | 81 |
| Particle Shape | spherical |
| Average Particle Size (micron) | <20 |
| Volatiles (max. %) | 0.1 |
| Color | white |

The polyethylene particles of said size are generally termed microfine particles and require grinding in order to achieve such small size. These microfine polyolefines are commercially available in aqueous dispersion and therefore can conveniently be used as such in the present composition. Generally, the dispersion of microfine polyolefin in water is blended with the latex containing the thickening solution and the amount of polyolefin in latex should be about 0.5 percent to 50 percent. A preferred amount of polyolefin in latex is 5 percent to 35 percent. Thereafter, the latex is stirred into the prepared pigment paste to produce a homogeneous composition. The total solid content of the coating composition should be approximately 30 percent – 70 percent and preferably, 45 percent to 60 percent.

The preferred liquid carrier or dispersing liquid for the polyolefin powders is water. Nevertheless, other liquid carriers may also be employed, and such liquids include mineral spirits, toluene, methyl isobutyl ketone, ethanol, ethyl acetate, perchloroethylene, and the like. Although some organic compounds, particularly the aromatic hydrocarbons, tend to swell the finely divided polyolefins resulting in the formation of a viscous mass, this may be desirable under certain circumstances. Since swelling is a time and temperature dependent function, such dispersions should be used immediately after they have been prepared. It will be understood, however, that the preferred carrier of the finely divided polyolefin is one which is inert to and will not attack the fine particles causing swelling and changes in the viscosity of the dispersion. Water is the ideal liquid carrier, but when the speed of the coating operation is critical and where solvent or carrier liquid recovery equipment is already available, the aforementioned organic carriers may be employed.

The latex composition, containing the finely divided polyolefine dispersion, may be applied to various substrates, as mentioned above, using conventional procedures such as dipping, brushing, spraying, rolling, et cetera.

As previously indicated, the present invention also includes the preparation of acoustical ceiling tiles having coated thereon the compositions of the present invention. Because of the rapid manufacturing techniques involving high speeds and heat, this has been an area of particular difficulty with regard to obtaining glossy coatings that are block resistant. The acoustical ceiling tiles generally composed of pressed tiles are made from fibers with or without a bonding agent. The fiber may be asbestos, wood, rock wool, glass wool, bagasse, straw, etc. Suitable bonding agents include vegetable glues, starches, casein, one of the various plastics such as the thermosetting resins, or inorganic binders such as sodium silicate or magnesium oxychloride. The tiles are coated in the manner utilized in coating various other substrates. The coating can be applied at various spreading rates depending upon the thickness of the vinyl coating desired and thereafter heated at temperatures of about 250°– 400° F whereupon the aqueous portion of the coating is evaporated and the latex containing the dispersed polyolefin fuses to form the desired smooth, glossy and block resistant coating.

The polyethylene particles having an average size of 8 to 30 microns and including in the dispersion from 0.01 percent to 2 percent, and preferably from 0.05 percent to 1 percent based on the latex, of any suitable anionic or nonionic surface acting agent such as Igepal CO-430, nonylphenoxy-poly (ethyleneoxy) ethanol; Sarkosyl LC pH=7, cocoyl sarcosine; Sarkosyl pH=7, steroyl sarcosine; Poly Tergent J-200, polyethoxyethyl aliphatic ether; ammonium stearate; dioctyl phthalate; and Aerosol TR, bis (tridecyl) ester of sodium sulfosuccinic acid.

The invention will be more fully understood by reference to the following examples which are set forth for purposes of illustration and are not to be construed as limiting upon the invention.

EXAMPLE I

Three pigment pastes containing the ingredients listed below were prepared by dispersing the ingredients on a high speed disperser. Any of the dispersers can be used such as Cowles Dissolver, Hockmeyer, Shar, Day Disperser. In general, a disperser is run at rim velocities of the impeller of 2,500 to 5,000 feet per minute. The lower ranges are used for agitation or blending operations while the upper ranges are used for dispersions and difficult solutions. In this example a Cowles disperser was used and the velocity of the impeller was 3200 feet per minute. These pastes, identified by letters A, B and C, contain the following ingredients:

|  | A | B | C |
|---|---|---|---|
| Water | 53.0 | 53.0 | 53.0 |
| 18% Phenyl Mercuric Acetate | 1.0 | 1.0 | 1.0 |
| Sodium Salt of Carboxylated Polyelecttrolyte | 5.2 | 5.2 | 5.2 |
| Soya Lecithin | 1.6 | 1.6 | 1.6 |
| Ammonia | 1.0 | 1.0 | 1.0 |
| Defoamer | 2.5 | 2.5 | 2.5 |
| Titanium Dioxide | 175.0 | 175.0 | 175.0 |
| Aluminum Silicate | — | — | 50.0 |

Each of the above-identified pastes were then blended by admixing the following latices listed A, B and C, wherein composition is given in terms of parts by weight:

|  | A | B | C |
|---|---|---|---|
| 3% Methyl Cellulose Solution | 100.0 | 100.0 | 100.0 |
| Polyco 2633 (an 80/20 Vcl/MA copolymer plasticized with 22.5 parts DOP) | 602.0 | 602.0 | 602.0 |
| Water dioctyl phthalate | — | 115.0 | 115.0 |
| Microthene FN 500 (microfine polyethylene powder) | 115.0 | — | — |

Polyco 2633 is a copolymer of vinyl chloride and methyl acrylate plasticized with dioctyl phthalate, as indicated, which has the following characteristics:

| Typical Latex Properties | Polyco 2633 |
|---|---|
| Total Solids, % | 56±1 |
| Viscosity | 25 |
| pH | 9.5 |
| Surface Tension, dynes/cm* | 32 |
| Specific Gravity of Latex | 1.14 |
| Specific Gravity of Solids | 1.28 |
| Weight/Gallon, lbs. | 9.5 |

*Brookfield model LVF, spindle No. 1, 30 rpm, 25° C.

The latex is prepared by admixing the polyolefin powder to the methyl cellulose solution and the Polyco latex. The mixture is agitated until it becomes smooth and well-dispersed. The polyolefin powder can also be admixed in the form of a dispersion which can be prepared by simply mixing the powder in water in presence of a suitable surfactant.

The coating Composition A prepared above is illustrative of the composition of the present invention. Composition B containing the identical ingredients but for the absence of the microfine polyolefin is set forth for purposes of comparison, as is Composition C which differs in the presence of the aluminum silicate pigment.

To illustrate the superiority of the instant coatings, each of the above Compositions A, B and C, were applied by brush at a spreading rate of 20 lbs. non volatile per 1,000 square feet to 12″ × 12″ commercially available acoustical ceiling asbestos panels. These coated panels were then baked at 350° F for 3 minutes and allowed to cool for 30 seconds at room temperature, after which they were placed face-to-face under approximately 4 psi pressure for 30 seconds. The panels were then pulled apart and rated as indicated in the following table. "Pass" indicates that no sound or tearing of the coating was noted on separating the panels.

TABLE I

EFFECT OF MICROFINE POLYOLEFIN ON COATING PROPERTIES

|  | A | B | C |
|---|---|---|---|
| Blocking Test | Pass | Fail | Pass |
| Gloss | High | High | Low |
| Yellowing Resistance | Good | Good | Good |

From the above it is apparent that the panels produced by utilizing the coatings A of the present invention, exhibit minimal blocking while at the same time exhibiting high gloss and good yellowing resistance. Composition B of high gloss had poor block properties, while Composition C, with added pigment, exhibited good blocking but low gloss.

The above descriptions, and particularly the examples, are set forth for purposes of illustration only. Many variations and modifications thereof will be apparent to those skilled in the art and can be made without departing from the spirit and scope of the invention herein described.

What is claimed is:

1. A coating composition which exhibits high gloss and low block consisting essentially of a pigment; a filler; and a plasticized vinyl resin latex containing at least 80 percent polymerized vinyl chloride selected from vinyl chloride copolymerized with a monomer selected from the group consisting of methyl acrylate, ethyl acrylate, methyl methacrylate, ethyl methacrylate and mixtures thereof, said latex having dispersed therein from 0.5 to 50 percent, based on the weight of the latex, of finely divided polyolefin particles having a particle size of from 8 to 30 microns.

2. Composition of claim 1 wherein said latex is selected from vinyl chloride-butyl acrylate or vinyl chloride-2-ethylhexyl acrylate copolymers containing at least 50 percent polymerized vinyl chloride.

3. Composition of claim 1 wherein said polyolefin is polyethylene and total solids content of said composition is from 30 to 70 percent by weight.

4. Composition of claim 2 wherein said polyolefin is polyethylene.

5. Composition of claim 3 wherein said pigment and filler amount to from 5 to 40 percent by volume of said latex.

6. Composition of claim 4 wherein said pigment and said filler amount to from 5 to 40 percent by volume of said latex, total solids content of said composition being from 30 to 70 percent by weight.

* * * * *

UNITED STATES PATENT OFFICE
CERTIFICATE OF CORRECTION

Patent No. 3,755,238     Dated August 28, 1973

Inventor(s) Ronald E. Wiita

It is certified that error appears in the above-identified patent and that said Letters Patent are hereby corrected as shown below:

On the cover sheet insert -- Assignee: The Borden Company, New York, N. Y., a corporation of New York --.

Signed and sealed this 19th day of February 1974.

(SEAL)
Attest:

EDWARD M.FLETCHER,JR.          C.MARSHALL DANN
Attesting Officer              Commissioner of Patents

PO-1050
(5/69)

UNITED STATES PATENT OFFICE
CERTIFICATE OF CORRECTION

Patent No. 3,755,238                    Dated August 28, 1973

Inventor(s) Ronald E. Wiita

It is certified that error appears in the above-identified patent and that said Letters Patent are hereby corrected as shown below:

Column 5, line 30, after water, delete "dioctyl phthalate".

Signed and sealed this 11th day of June 1974.

(SEAL)
Attest:

EDWARD M. FLETCHER, JR.
Attesting Officer

C. MARSHALL DANN
Commissioner of Patents